(12) United States Patent
Hayakawa

(10) Patent No.: US 11,260,403 B2
(45) Date of Patent: Mar. 1, 2022

(54) CENTRIFUGAL SEPARATOR INCLUDING NONCONTACT SEAL AND NONCONTACT TORQUE TRANSFER MECHANISM, AND CENTRIFUGAL SEPARATION SYSTEM CONTAINING THE SAME

(71) Applicant: MITSUI ELECTRIC CO., LTD., Noda (JP)

(72) Inventor: Kazushige Hayakawa, Kashiwa (JP)

(73) Assignee: Mitsui Electric Co., Ltd., Chiba (JP)

( * ) Notice: Subject to any disclaimer, the term of this patent is extended or adjusted under 35 U.S.C. 154(b) by 486 days.

(21) Appl. No.: 16/319,922

(22) PCT Filed: Dec. 16, 2017

(86) PCT No.: PCT/JP2017/045228
§ 371 (c)(1),
(2) Date: Jan. 23, 2019

(87) PCT Pub. No.: WO2018/116999
PCT Pub. Date: Jun. 28, 2018

(65) Prior Publication Data
US 2019/0240680 A1    Aug. 8, 2019

(30) Foreign Application Priority Data

Dec. 21, 2016 (JP) .............................. JP2016-248366

(51) Int. Cl.
*B04B 9/08* (2006.01)
*B04B 1/02* (2006.01)
(Continued)

(52) U.S. Cl.
CPC .................. *B04B 9/08* (2013.01); *B04B 1/02* (2013.01); *B04B 9/10* (2013.01); *B04B 11/00* (2013.01); *B04B 11/02* (2013.01); *F16J 15/447* (2013.01)

(58) Field of Classification Search
CPC .. B04B 9/08; B04B 11/00; B04B 1/02; B04B 11/02; B04B 9/10; B04B 2005/0485; B04B 5/0442; F16J 15/447; F16J 15/164
(Continued)

(56) References Cited

U.S. PATENT DOCUMENTS 5,259,828 A * 11/1993 Schlieperskoetter ..... B04B 1/20
494/38
5,948,271 A * 9/1999 Wardwell ................ B04B 11/02
210/739

(Continued)

FOREIGN PATENT DOCUMENTS

JP       S63-182368 U    11/1988
JP        4514338 A      7/2010
(Continued)

OTHER PUBLICATIONS

JP 2015036134 Description Espacenet English Machine Translation.*

*Primary Examiner* — Walter D. Griffin
*Assistant Examiner* — Shuyi S. Liu
(74) *Attorney, Agent, or Firm* — Carrier Blackman & Associates, P.C.; William D. Blackman; Joseph P. Carter

(57) ABSTRACT

A centrifugal separator includes a rotating body driving and sealing structure in which a hermetically sealed space is formed between a rotating body and an outer case by sealing the inside and outside using a noncontact seal during rotation of the rotating body, in an airtight manner. A rotation coupling unit is provided at the upper end of a centrifugal cylinder, and even when the centrifugal cylinder is deformed during use causing an internal fluid to leak through a fitting portion of a bottom member to the centrifugal cylinder, the fluid leaks in the hermetically sealed space so that the driving system or the like is not contaminated.

16 Claims, 4 Drawing Sheets

(51) Int. Cl.
  *F16J 15/447*  (2006.01)
  *B04B 11/02*  (2006.01)
  *B04B 9/10*  (2006.01)
  *B04B 11/00*  (2006.01)

(58) Field of Classification Search
  USPC ...... 494/1, 2, 10, 37, 43, 45, 47, 48, 50, 56,
       494/63, 67; 435/2; 604/408, 410, 604,
                              604/6.1, 9
  See application file for complete search history.

(56) References Cited

U.S. PATENT DOCUMENTS

| | | | |
|---|---|---|---|
| 6,733,433 B1* | 5/2004 | Fell | A61M 1/3693 |
| | | | 435/2 |
| 7,909,335 B2* | 3/2011 | Turnquist | F16J 15/3292 |
| | | | 277/355 |
| 2016/0339451 A1* | 11/2016 | Meisberger | C07D 253/075 |
| 2020/0230616 A1* | 7/2020 | Koenig | B04B 1/08 |

FOREIGN PATENT DOCUMENTS

| | | | | |
|---|---|---|---|---|
| JP | 2015-036134 A | 2/2015 | | |
| JP | 2015036134 A | * | 2/2015 | B01D 19/02 |

* cited by examiner

CENTRIFUGAL SEPARATOR INCLUDING NONCONTACT SEAL AND NONCONTACT TORQUE TRANSFER MECHANISM, AND CENTRIFUGAL SEPARATION SYSTEM CONTAINING THE SAME

TECHNICAL FIELD

The present invention relates to a centrifugal separator including a rotating body driving and sealing structure that has a noncontact seal and a noncontact driving system and capable of centrifugation treatment without causing contamination, and a centrifugal separation system including the centrifugal separator and being applicable to separation of at least one component from a dispersing liquid containing a plurality of components different in density.

BACKGROUND ART

A technique of separating at least one component from a dispersing liquid containing a plurality of components different in density is used in various fields. For example, the necessity of effective blood component treatment has increased in medical fields, so that various blood separators and methods for separating at least one kind of component from blood containing red blood cells, white blood cells, platelets, and plasma are developed. As such a blood separator, a separator including a centrifugal separator for separating blood components using a difference in density of the components in blood has been proposed, for example (see Patent Literature 1).

The centrifugal separator disclosed in Patent Literature 1 is rotatable around its rotation axis, and mainly includes a supply port/exhaust port provided at its upper end for a fluid to be treated and a treated component of the fluid, a treatment chamber provided inside the centrifugal separator with a piston movable in an axial direction of the treatment chamber, and means for monitoring a position of the movable member in the axial direction to control the amount of a biological fluid to be taken into the treatment chamber and the amount of a plurality of components separated and pushed out.

CITATION LIST

Patent Literature

[PTL1] JP 2002-533171 A1

SUMMARY OF INVENTION

Technical Problem

Unfortunately, the centrifugal separator disclosed in Patent Literature 1 is configured such that when the piston rises in the treatment chamber to push out a fluid after being treated, the fluid necessarily leaks through a gap between the supply port/exhaust port of the treatment chamber, which is rotating in a rotation seal provided at the upper end of the treatment chamber, and a lower end of an unrotatable central pipe. In the rotation seal, rubber seals exposed to high-speed rotation above and below a friction disk are brought into contact with the friction disk, which may result in abrasion of the rubber seals and cause broken pieces. When the broken pieces are slightly mixed in the leaked fluid, the broken pieces may cause a phenomenon in which the fluid is contaminated (contamination). The rubber seals each are also likely to be deformed by frictional heat, so that the leaked fluid may flow out through the deformed rubber seal to be brought into contact with the rubber seal below the friction disk and a bearing and the like. As a result, broken pieces of the rubber seal below the friction disk and the like may be mixed into the fluid to cause contamination. The fluid thus contaminated flows into the treatment chamber again due to the pressure reduction caused by movement of the piston in the treatment chamber, so that this contamination causes a significant problem.

The treatment chamber is deformed by high-speed rotation such that its axial intermediate region is expanded outward. This may cause an interstice between an inner peripheral wall of the treatment chamber and a rubber seal in the outer periphery of the piston. As a result, the fluid on the piston may leak downward through the interstice to contaminate a rotationally driving system in the treatment chamber.

The present invention has been made to solve such problems, and an object thereof is to provide a centrifugal separator and a centrifugal separation system containing the same. The centrifugal separator has a rotating body driving and sealing structure including a noncontact seal and a noncontact driving system, thereby applicable to reliable separation of at least one component from a dispersing liquid containing a plurality of components different in density without a risk of contamination.

Solution to Problem

According to an aspect of the present invention, the above object is also achieved by a centrifugal separator including: a centrifugal cylinder supported at opposite end regions in a vertical axial direction to be rotatable around an axis of the centrifugal cylinder, the centrifugal cylinder having an upper end provided with an inflow-outflow pipe for a fluid to be treated or a component fluid after being treated; a movable member movable up and down in the vertical axial direction inside the centrifugal cylinder in a state where an outer periphery of the movable member is in close contact with an inner peripheral surface of the centrifugal cylinder; a rotation coupling unit provided at an upper end portion of the inflow-outflow pipe; a outer case bottomed and disposed outside the centrifugal cylinder so as to surround the centrifugal cylinder, the outer case having an upper side provided with an opening for passing through the centrifugal cylinder and a lower side provided with a partition wall for closing the lower side to form a bottom; a noncontact torque transfer mechanism composed of a driven end connected to a lower end of the centrifugal cylinder directly or indirectly, and a drive shaft disposed across the partition wall and facing an end face of the driven end from outside the outer case, the drive shaft being supported so as to rotate on receiving rotational driving force, the drive shaft having a drive end provided at an end close to the partition wall of the drive shaft; a drive motor for applying the rotational driving force to the driving end; and a noncontact seal provided close to the upper end of the centrifugal cylinder, which protrudes from the outer peripheral wall of the centrifugal cylinder and the inner peripheral wall of the outer body to face each other to form a gap between the rotary body and the outer body so as to form a gap between the outer case and the noncontact seal in a direction orthogonal to the axis, the noncontact seal being configured to seal the gap by the centrifugal cylinder being rotated via the noncontact torque transfer mechanism; at least one sensor provided to measure and monitor a flow rate or color of a liquid phase of a component fluid after being treated; and a control device capable of receiving an output signal from the sensor and outputting an instruction signal for increasing and reducing a rotation speed of the centrifugal cylinder to the drive motor, on the basis of the received output signal.

According to yet another aspect of the present invention, the above object is also achieved by a centrifugal separation system comprising the following (1) to (6).

(1) A centrifugal separator comprising: a centrifugal cylinder supported at opposite end regions in a vertical axial direction to be rotatable around an axis of the centrifugal cylinder, the centrifugal cylinder having an upper end provided with an inflow-outflow pipe for a fluid to be treated or a component fluid after being treated;

a movable member movable up and down in the vertical axial direction inside the centrifugal cylinder in a state where an outer periphery of the movable member is in close contact with an inner peripheral surface of the centrifugal cylinder;

a rotation coupling unit provided at an upper end portion of the inflow-outflow pipe;

a outer case bottomed and disposed outside the centrifugal cylinder so as to surround the centrifugal cylinder, the outer case having an upper side provided with an opening for passing through the centrifugal cylinder and a lower side provided with a partition wall for closing the lower side to form a bottom;

a noncontact torque transfer mechanism composed of a driven end connected to a lower end of the centrifugal cylinder directly or indirectly, and a drive shaft disposed across the partition wall and facing an end face of the driven end from outside the outer case, the drive shaft being supported so as to rotate on receiving rotational driving force, the drive shaft having a drive end provided at an end close to the partition wall of the drive shaft; and a noncontact seal provided close to the upper end of the centrifugal cylinder so as to form a gap between the outer case and the noncontact seal in a direction orthogonal to the axis, the noncontact seal being configured to seal the gap by the centrifugal cylinder being rotated via the noncontact torque transfer mechanism;

(2) a pipe having one end connected to an upper end of the rotation coupling unit provided in the centrifugal separator, and the other end branching into a plurality of branch pipes;

(3) at least one sensor provided at a midpoint in the pipe to measure and monitor a flow rate or color of a liquid phase of a component fluid after being treated that is fed through the pipe;

(4) a container for a fluid to be treated and a container for at least one component fluid after being treated, the containers being connected to the corresponding branch pipes so as to communicate therewith;

(5) selector valves appropriately provided at a midpoint in each of the plurality of branch pipes, a branch point of each of the plurality of branch pipes, or a branch point between the plurality of branch pipes and the pipe, the selector valves being capable of switching operation using electromagnetic action; and (6) a control device capable of receiving an output signal from the sensor and outputting an instruction signal for switching between opening and closing of each of the selector valves, or for increasing and reducing a rotation speed of the centrifugal cylinder, on the basis of the received output signal.

Advantageous Effects of Invention

The centrifugal separator of the present invention includes the noncontact seal and the noncontact torque transfer mechanism as described above. Thus, even when a fluid leaks in the rotation coupling unit provided at the upper end of the centrifugal cylinder, this does not cause contamination in which broken pieces caused by abrasion of a material of a rubber seal or the like are mixed into the fluid like a conventional contact seal. In addition, even when the centrifugal cylinder is deformed so as to expand outward during rotation to cause an internal fluid to leak through a fitting portion of a bottom member to the centrifugal cylinder, the fluid leaks in the hermetically sealed space. Thus, the leaked fluid is not brought into contact with a driving system or the like, so that the driving system or the like is not contaminated.

The centrifugal separation system of the present invention includes the centrifugal separator of the present invention, and is configured such that a flow rate sensor or the like is provided at a midpoint in a pipe connected to an inflow-outflow port of the centrifugal separator, and the pipe is connected to the container for a fluid to be treated and the container for the at least one component fluid via the plurality of selector valves. This enables at least one component fluid to be separated from the fluid to be treated without causing a problem of contamination.

DESCRIPTION OF EMBODIMENT

Next, an example of a rotating body driving and sealing structure which has the noncontact seal rotating body driving and the noncontact torque transfer mechanism, provided in the centrifugal separator according to an embodiment of the present invention will be described in detail with reference to the accompanying FIG. 1.

[Rotating Body Driving and Sealing Structure]

Figure 1:
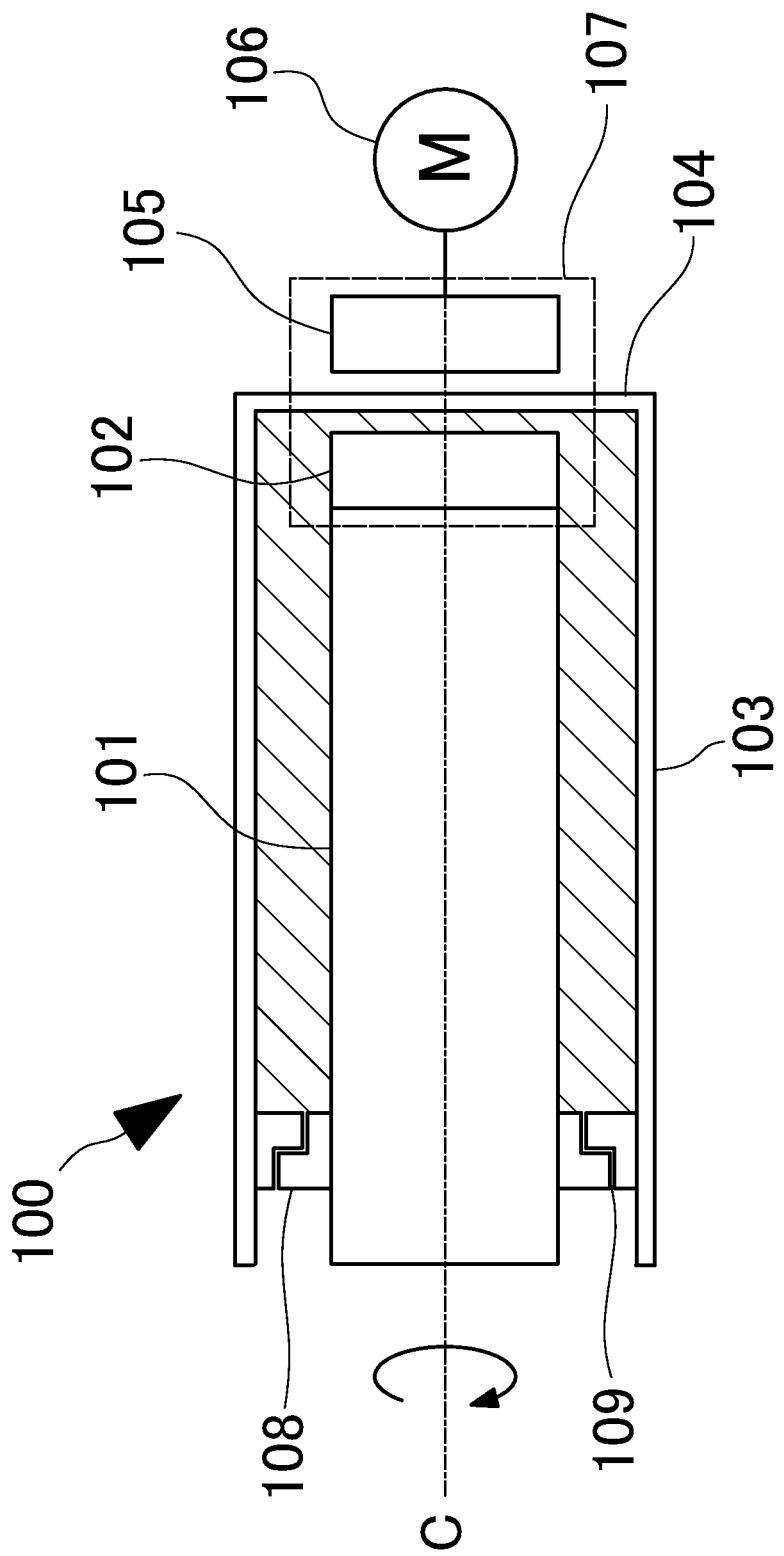
FIG. 1 is a schematic view for explaining an example of a rotating body driving and sealing structure which has the noncontact seal rotating body driving and the noncontact torque transfer mechanism, provided in a centrifugal separator according to an embodiment of the present invention.

As illustrated in FIG. 1, a rotating body driving and sealing structure 100 of the present embodiment mainly includes a rotating body 101 and an outer case 103. The rotating body 101 is supported by bearings (not illustrated) and the like, provided at its opposite ends in an axis C direction in a rotatable manner around the axis C.

Although an outer shape of the rotating body 101 is not illustrated in FIG. 1, various outer shapes, such as a cylindrical columnar shape, a rectangular columnar shape, and an elliptical body-like shape can be used. For example, the rotating body 101 may have an outer shape in which a portion relatively smaller and thinner in size in a direction orthogonal to the axis C direction than the rotating body 101 is provided concentrically with the rotating body 101 in its one end region or in each of its opposite end regions, in the axis C direction. In addition, the rotating body 101 may be provided in its intermediate region with steps varying in the size stepwise in at least one place at any position in the direction orthogonal to the axis C direction. Among them, it is preferable that the rotating body 101 is a hollow-bottomed cylindrical container.

The outer case 103 is disposed outside the rotating body 101 so as to surround the rotating body 101 while being concentric with the axis C without being rotated itself. In the example of FIG. 1, the outer case 103 is disposed concentrically with the axis C of the rotating body 101. However, if the axis line of this outer body 103 is parallel to the direction of the axis C of the rotating body 101, it is not limited to such concentric arrangement. The outer case 103 may have an axis parallel to the axis C direction of the rotating body 101. The outer case 103 has one end in the axis C direction that is closed by a partition wall 104 provided in a direction substantially orthogonal to the axis C direction. The outer case 103 is not particularly limited in shape as long as it can surround the rotating body 101 in its inside and includes the partition wall 104. For example, the shape can be appropriately selected for use from among previously known shapes such as a cylindrical shape.

The rotating body 101 is provided at one end in the axis C direction with a driven end 102. Outside the outer case 103 across the partition wall 104, a drive end 105 is provided such that its end face and an end face of the driven end 102 face each other. The driven end 102 and the drive end 105 are combined to constitute a noncontact torque transfer mechanism 107. Although previously known various types of transfer mechanism can be used as the transfer mechanism 107 as long as torque can be transferred between the driven end 102 and the drive end 105 disposed with the partition wall 104 interposed therebetween in a noncontact manner, preferable mechanisms include a magnetic coupling, for example. The drive end 105 can rotate on receiving the rotational driving force of a drive motor 106 that is directly or indirectly connected to the drive end 105. The transfer mechanism 107 is configured such that when the drive end 105 is rotated, its driving force is transferred to the driven end 102 to rotate the rotating body 101.

Near the other end of the rotating body 101 in the axis C direction, a noncontact seal 108 is provided between the rotating body 101 and the outer case 103. The noncontact seal 108 illustrated in FIG. 1 has two protrusions which protrude in a direction close to each other from the outer peripheral wall of the rotating body 101 and the inner peripheral wall of the outer body 103 as if they close the space between the rotating body 101 and the outer body 103 in a direction orthogonal to the direction C, therefore a gap 109 which communicates inside and outside of the external body 103 is formed. This noncontact seal can be appropriately selected for use from among previously known various types of noncontact seals, such as a labyrinth seal, a screw thread seal, a lubrication groove, a flinger or the like in consideration of properties of a fluid to be treated. It is preferable to use a labyrinth seal among the types above.

The rotating body driving and sealing structure 100 is configured, as described above, such that the outer case 103 is closed on its drive side by the partition wall 104 and the partition wall 104 is interposed between the drive end 105 and the driven end 102 to constitute the noncontact torque transfer mechanism 107 and such that the gap 109 of the noncontact seal 108 is sealed during rotation of the rotating body 101. This enables a hermetically sealed space to be formed by sealing a space (a region hatched with oblique lines) surrounded by the rotating body 101, the outer case 103, the partition wall 104, and the noncontact seal 108, in an airtight manner. The hermetically sealed space can be formed as described above, so that during rotation of the rotating body 101, inflow of a fluid (including gas) from outside the space and outflow of a fluid (including gas) inside the space can be reduced, and the inside of the space can be sterilized, for example, as needed.

[Centrifugal Separator]

Figure 2:
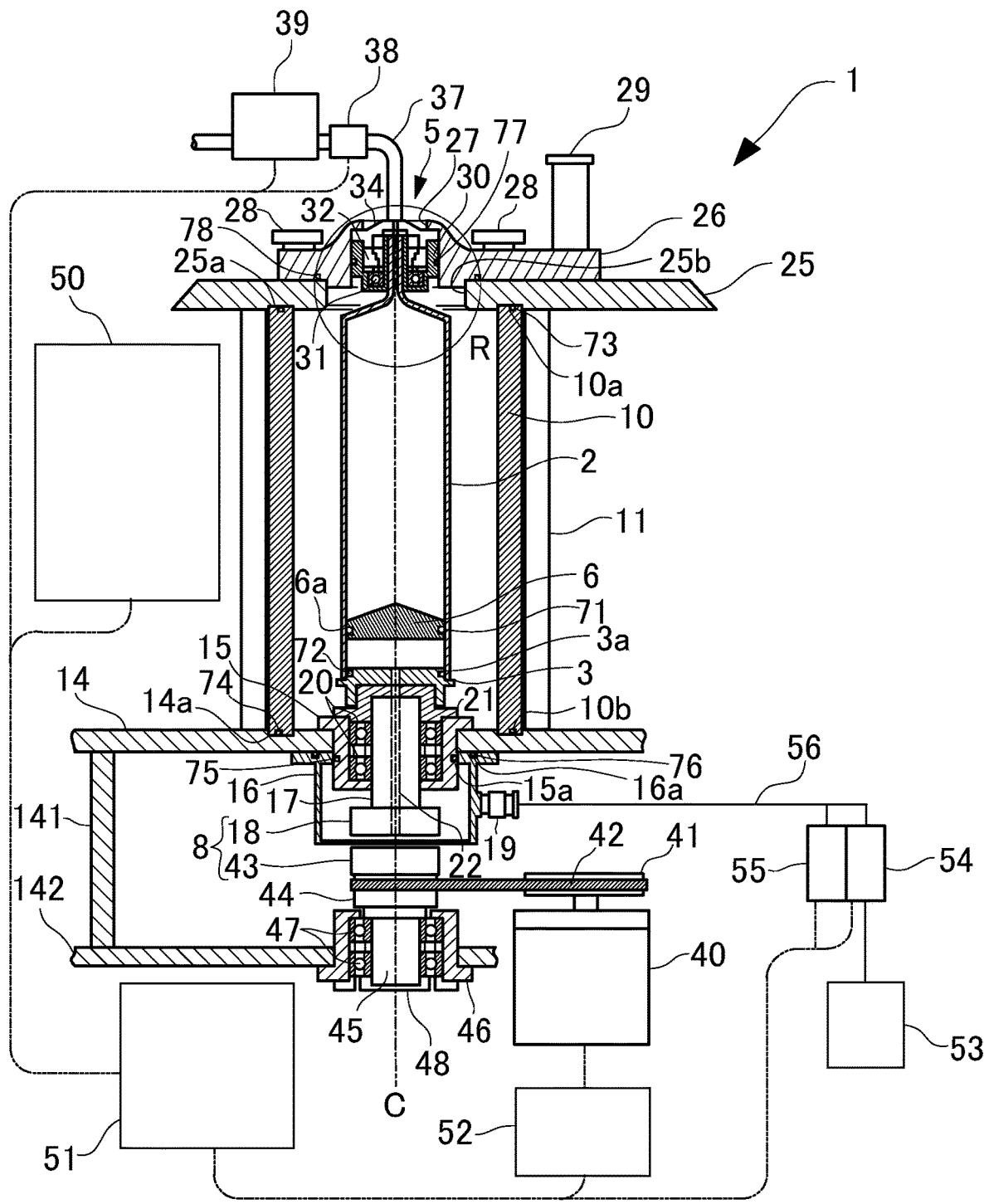
FIG. 2 is a partly-sectioned view illustrating a centrifugal separator according to an embodiment of the present invention.
Figure 3:
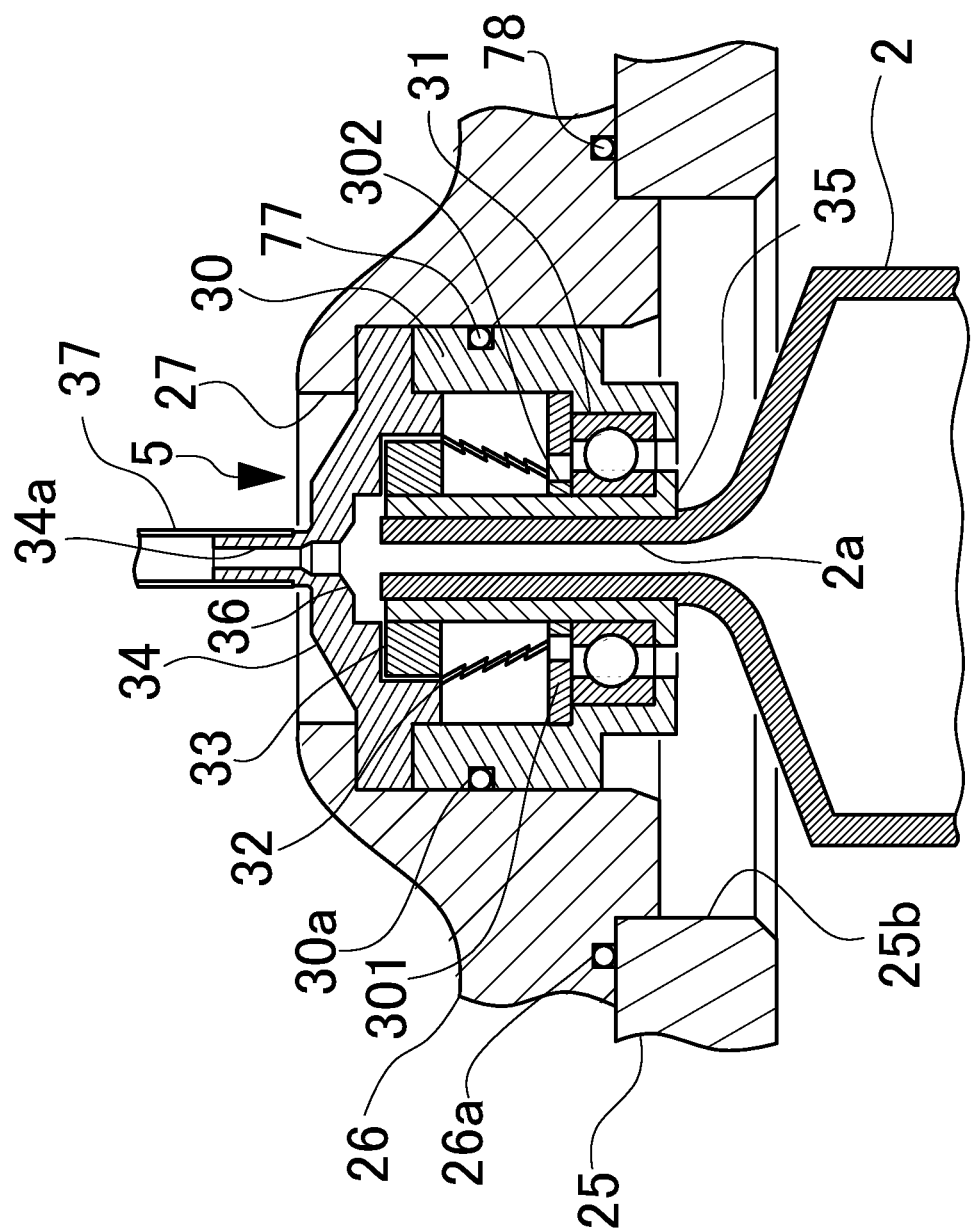
FIG. 3 is an enlarged sectional view of a portion surround by a circle R in FIG. 1.
Figure 4:
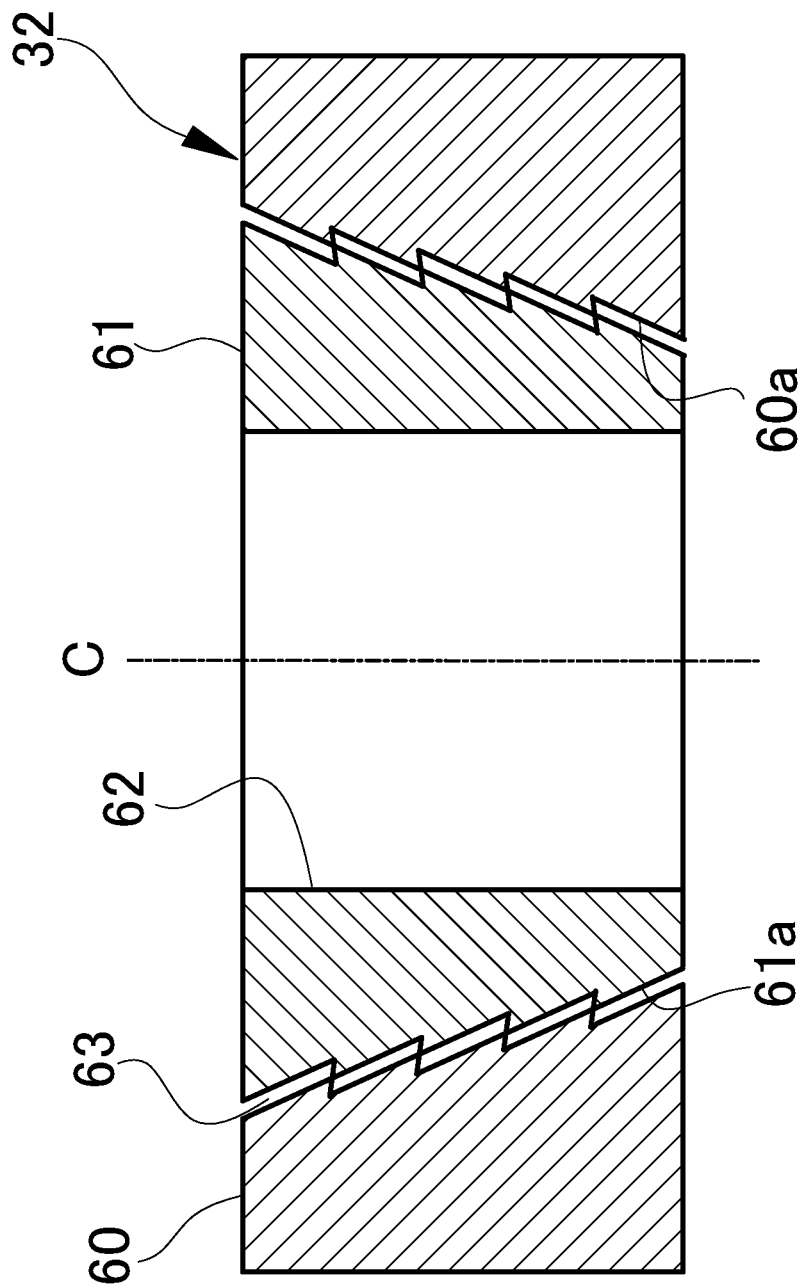
FIG. 4 is a longitudinal sectional view of a noncontact seal illustrated in FIG. 3.

A centrifugal separator according to an embodiment of the present invention including the rotating body driving and sealing structure illustrated in FIG. 1, will now be described in detail with reference to the accompanying FIGS. 2 to 4. FIG. 2 is a partly-sectioned view illustrating the centrifugal separator according to the embodiment of the present invention. FIG. 3 is an enlarged sectional view of a portion surround by a circle R in FIG. 1, and FIG. 4 is a longitudinal sectional view of a noncontact seal illustrated in FIG. 3. As illustrated in FIGS. 2 and 3, a centrifugal separator 1 of the present embodiment mainly includes a centrifugal cylinder 2, a rotary joint (rotation coupling unit) 5, a magnetic coupling 8, and a resin chamber (outer case) 10.

The centrifugal cylinder 2 includes a barrel in a cylindrical shape with a constant thickness and inner diameter as a rotating body that is rotatable around its axis C. The barrel is provided with a reduced-diameter portion near its upper end, and an inflow-outflow pipe 2a having an outer diameter relatively smaller than that of the barrel is provided on the reduced-diameter portion integrally and coaxially with the barrel. The inflow-outflow pipe 2a, which rotates with rotation of the centrifugal cylinder 2, has a leading end (inflow-outflow port) 2a that is inserted into a coupling 36 from a lower end side of a rotary joint 5 to be disposed.

The centrifugal cylinder 2 is provided in its inside with a movable member (piston) 6, with an outer periphery thereof being in close contact with an inner peripheral wall of the centrifugal cylinder 2, such that the movable member 6 is vertically movable in an axis C direction of the centrifugal cylinder 2. Vertical motion of the piston 6 enables a fluid to be treated to be drawn into the centrifugal cylinder 2, or a component fluid after being treated to flow out from the centrifugal cylinder 2. The piston 6 has an upper surface formed in a conical outer shape so as to bring into contact with an inner surface of the reduced-diameter portion near the upper end of the centrifugal cylinder 2. The movable member 6 is provided in its outer periphery with an O-ring groove 6a into which an O-ring 71 is fitted. This secures close contact between the outer periphery of the movable member 6 and the inner peripheral wall of the centrifugal cylinder 2, so that circulation of fluid (including gas) above and below the movable member 6 can be prevented.

The centrifugal cylinder 2 is not particularly limited in material, and a material can be appropriately selected for use from among previously known metals, resins or the like. When an internal state of the centrifugal cylinder 2 needs to be observed, resin, particularly transparent resin, may be preferably used. When the piston 6 is vertically moved by blowing and ejection of compressed air from below the centrifugal cylinder 2 like the present embodiment, at least a space below the piston 6 in the centrifugal cylinder 2 is increased in pressure or reduced in pressure. Thus, it is preferable that the centrifugal cylinder 2 has a thickness for bearing the pressure. An example of the transparent resin described above, which is excellent in strength characteristics and facilitates manufacturing of thick products, includes acrylic resin and the like, for example.

The rotary joint (rotation coupling unit) 5 in the present embodiment is a unit for connecting the inflow-outflow pipe 2a being a rotating body and the coupling 36 from a fixed pipe 34a to feed fluid to a fixed pipe 34a from the inflow-outflow pipe 2a rotated, or feed fluid inversely. The rotary joint 5 includes a rotary joint case 30 constituting an outer periphery thereof, and a rotary joint shaft 35 fitted onto the inflow-outflow pipe 2a, and has a space formed in a torus-shape between the rotary joint case 30 and the rotary joint shaft 35, in which a bearing 31 and a labyrinth seal 32 as a noncontact seal are provided from below with a spacer 301 for supporting an outer ring of the labyrinth seal and a spacer 302 for supporting an inner ring of the labyrinth seal, interposed and stacked therebetween.

As illustrated in FIGS. 3 and 4, the labyrinth seal 32 is composed of an inner ring 61 having an insertion hole 62 in its central region, and an outer ring 60. The insertion hole 62 is formed so as to substantially match the outer diameter of the rotary joint shaft 35. Inside the rotary joint case 30, the rotary joint shaft 35 is fitted into the insertion hole 62, and the inner ring 61 is arranged to protrude in a radial direction from the outer peripheral surface of the shaft 35. The inner ring 61 rotates with the rotation of the shaft 35. On the other hand, the outer ring 60 horizontally protrudes from the inner peripheral wall of the rotary joint case 30 in a direction close to the inner ring 61, and is provided so as to close the opening of the outer body 103. The outer ring 60 is fixed to the rotary joint case 30 and does not rotate.

As shown in FIGS. 3 and 4, an outer peripheral surface of the inner ring 61 and an inner peripheral surface of the outer ring 60 are each formed so as to be substantially oblique downward from above to come close to the axis C in their longitudinal sections. In other words, the outer peripheral surface of the inner ring 61 and the inner peripheral surface of the outer ring 60 are each formed in a stepped tapered shape as they extend downward from above, approaching the axis of the centrifugal cylinder. Specifically, while the outer peripheral surface of the inner ring 61 is formed such that its outer diameter sequentially decreases from above downward intermittently and stepwise, the inner peripheral surface of the outer ring 60 is formed such that its inner diameter sequentially decreases from above downward intermittently and stepwise. Both of the rings are adjusted such that a gap between stepwise surfaces of the respective rings, facing each other, becomes a predetermined distance (a labyrinth gap 63).

The inner ring 61 and the outer ring 60 of the labyrinth seal 32 are provided immediately below a rotary-joint cover 34, as shown, with the torus-shaped spacer 301 provided for supporting the outer ring 60 and the torus-shaped spacer 302 provided for supporting the inner ring 61, respectively. The inner ring 61 is configured so as to be tightened from above and fixed to the rotary joint shaft 35 by screwing a rotary-shaft nut 33 onto the rotary joint shaft 35. The rotary-shaft nut 33 attached as described above is covered with the rotary-joint cover 34 placed thereon. The cover 34 is provided in its lower portion with a protrusion in the shape of a ring having an outer diameter substantially equal to an inner diameter of a rotary-joint housing chamber 27. The protrusion is configured to press the outer ring 60 of the labyrinth seal from above in the rotary-joint housing chamber 27, thereby fixing a position of the outer ring 60. The inner ring 61 is designed to be disposed at the same height position as the outer ring 60 by the configuration above.

The present embodiment is configured such that the labyrinth gap 63 is adjustable for distance by varying a degree of tightening of the rotary shaft nut 33, replacing the spacer 302 for supporting an inner ring with a spacer slightly different in vertical thickness, or performing both of them, to slightly vary a height position of the inner ring 61 vertically with respect to that of the outer ring 60. When the labyrinth gap 63 is configured to be adjustable for distance in accordance with a level of viscosity of a fluid to be treated as described above, there is an advantage of enabling separation treatment to be available for a wide range of viscosity of a fluid to be treated.

The inflow-outflow pipe 2a of the centrifugal cylinder 2 is introduced into the rotary joint 5 assembled as described above from its lower end face, and a liquid phase tube 37 is connected to its upper end face with the fixed pipe 34a extending upward from the upper end face. Although the liquid phase tube 37 is not particularly limited as long as it has an inner diameter slightly smaller than an outer diameter of the fixed pipe 34a, and has flexibility and elasticity of allowing it to be fitted onto an upper end of the fixed pipe 34a and connected, it is preferably transparent. This is because a centrifugal separation system of the present invention described below uses a sensor for measuring and monitoring a flow rate and color of a fluid flowing through the liquid phase tube 37. Depending on properties of a fluid to be treated, the liquid phase tube 37 may further have characteristics such as acid resistance and alkali resistance.

The rotary joint 5 configured as described above is housed in the rotary-joint housing chamber 27 of a seal lid 26 while being sealed by an O-ring 77 in an O-ring groove 30a provided in an outer peripheral surface of the rotary joint case 30 in its circumferential direction. The seal lid 26 is fixed to a top plate 25 disposed at a height substantially equal to that of a rising portion of the inflow-outflow pipe 2a extending upward from a neck portion reduced in diameter of the centrifugal cylinder 2, in the present embodiment. The top plate 25 is provided in its central region with an opening 25b for allowing the centrifugal cylinder 2 to be vertically inserted therethrough. The seal lid 26 has an O-ring groove 26a that is concentric with the opening 25b and provided in its lower surface throughout the circumference of the lower surface in a circular shape with a diameter more than that of the opening 25b as viewed from above, and an O-ring 78 is fitted in the O-ring groove 26a. The O-ring 78 and the O-Ring 77 described above can prevent appropriate gas in the resin chamber 10 from leaking through an interstice between the top plate 25 and the seal lid 26, or prevent outside air from flowing into the resin chamber 10 through the interstice. The appropriate gas includes various kinds of gas filled in the resin chamber for sterilization as needed, other than air existing in the resin chamber.

The periphery of the opening 25b is provided with tapped holes drilled for receiving respective seal locks 28, 28, . . . , disposed in the periphery of the rotary joint 5 in the seal lid 26. After the seal lid 26 is disposed in place, each of the seal locks 28 is turned to screw its leading end into the corresponding one of the tapped holes provided in the top plate 25, thereby fixing the seal lid 26 to the top plate 25. The seal lid 26 is provided in its one end portion with a through hole, and a seal hinge pin 29 provided upright on the top plate 25 is inserted into the through hole. The seal lid 26 is configured to be rotatable around the seal hinge pin 29.

The centrifugal separator 1 of the present embodiment is configured such that after the centrifugal cylinder 2 with the rotary joint 5 attached is fitted into a bottom member 3 and installed, the seal lid 26 is turned around the pin 29 while being lifted immediately above along the seal hinge pin 29 to be disposed immediately above the rotary joint 5. Then, the rotary joint 5 is housed in the rotary-joint housing chamber 27 of the seal lid 26. Subsequently, each of the seal locks 28 is operated to fix the seal lid 26 to the top plate 25 while bringing it into close contact with the top plate 25. This allows the centrifugal cylinder 2 and the rotary joint 5 to be set, so that inflow of a fluid to be treated and centrifugation treatment can be stared.

When a fluid to be treated is a biological fluid such as blood and the centrifugal separator 1 of the present embodiment is used to separate components of the fluid to be treated, there are available the centrifugal cylinder 2 provided with the piston 3 and the rotary joint 5 disposed at the upper end thereof, described above, each being detachably configured as instruments of a disposable type. These instruments are usually sterilized. When the sterilized disposable instruments as described above are used, the fluid to be treated can be subjected to separation treatment while the inside of each of the instruments is maintained in a sterilized state, thereby enabling separation treatment with higher accuracy.

As illustrated in FIG. 1, the barrel of the centrifugal cylinder 2 has a lower end opened. Into the opening, the bottom member 3 having a central region protruding upward with a diameter substantially equal to an inner diameter of the centrifugal cylinder 2 and a flange formed outside the central region is fitted such that the protruding portion forms a raised bottom. The protruding portion is provided in its outer peripheral surface with an O-ring groove 3a in its circumferential direction, and an O-ring 72 is fitted in the O-ring groove 3a to be brought into close contact with the inner peripheral wall of the centrifugal cylinder 2.

Below the bottom member 3, a chamber inner shaft 17 receiving rotational driving force by itself to rotate the centrifugal cylinder 2 is disposed as a driven shaft. The chamber inner shaft 17 is rotatably supported by two bearings 20 and 20 housed in a bearing housing chamber in a chamber bearing holder 15, and protrudes downward by passing through an opening drilled at the bottom of the bearing holder 15. The chamber bearing holder 15 is fitted into an opening drilled concentrically with the centrifugal cylinder 2 in a central region of an intermediate plate 14. The bearings 20 and 20 are fixed by a bearing cap 21 from above together with the chamber inner shaft 17. The bearing cap 21 includes a protruding portion which protrudes upward in a cylindrical columnar shape to cover an upper end of the driven shaft 17, and a lower cylindrical portion of the bottom member 3 is fitted onto the protruding portion. Then, the bottom member 3 is connected and fixed to the chamber inner shaft 17 on its upper side with the bearing cap 21 interposed therebetween. The chamber bearing holder 15 extending downward through an insertion hole of the intermediate plate 14 is provided in its outer peripheral surface with an O-ring groove 15a throughout its circumference at a position slightly below the intermediate plate 14, and an O-ring 75 is fitted in the O-ring groove 15a.

The chamber inner shaft 17 is provided on its lower side with a driven end 18 that is concentric with the axis C thereof and that has an outer shape relatively larger in size than the chamber inner shaft 17. The driven end 18 constitutes a part of the magnetic coupling 8 (described below) together with a drive end 43 described below. Rotational driving force (torque) transmitted to the drive end 43 is transmitted to the driven end 18 with the magnetic action without contact.

The bottom member 3, the bearing cap 21, the driven shaft 17, and the driven end 18 are each provided in its central region with a vent hole 22 substantially centered on its axis C. The vent hole 22 communicates from a lower face of the driven end 18 to a space below the piston 6 in the centrifugal cylinder 2.

Between the top plate 25 and the intermediate plate 14, the centrifugal cylinder 2 and the resin chamber (outer case) 10 provided concentrically with the centrifugal cylinder 2 so as to surround it from its periphery are disposed in their central regions. The resin chamber 10 has an upper end fitted into a groove provided in a central region of a lower face of the top plate 25, and a lower end fitted into a groove provided in a central region of an upper face of the intermediate plate 14, at a position vertically corresponding to the groove above. The resin chamber 10 is provided in its upper end face and lower end face with O-ring grooves 10a and 10b, respectively, each of which is disposed in an intermediate region in a thickness direction of the resin chamber 10 while being concentric with its axis, and O-rings 73 and 74 are fitted in the O-ring grooves 10a and 10b, respectively. The O-rings 73 and 74 are reliably brought into close contact with the resin chamber 10 and the top plate 25, and the resin chamber 10 and the intermediate plate 14, respectively, to maintain high airtightness. This enables a space in the resin chamber 10 except the centrifugal cylinder 2 to be increased in pressure, and also enables sterilization with gas charging or the like, as needed.

The resin chamber 10 may have thickness and strength of a level allowing its internal space to be increased or reduced in pressure as appropriate, so that previously known various kinds of material are available without specific restriction. Particularity, when a state inside the resin chamber 10 needs to be observed, for example, a molding made of previously known resin such as acrylic resin is available as with the centrifugal cylinder 2.

Outside the resin chamber 10, a plurality of chamber stays 11, 11, . . . is disposed and fixed on a concentric circle of the centrifugal cylinder 2. The chamber stays 11, 11 serve to determine a height position of each of the top plate 25 and the intermediate plate 14 to more reliably fix the resin chamber 10 from above and below.

The intermediate plate 14 is provided on its lower side with a coupling chamber 16 attached. The coupling chamber 16 has a barrel in a bottomed cylindrical shape that is provided at its upper end with a flange throughout its circumference. The flange is provided in its face in contact with a lower face of the intermediate plate 14 with an O-ring groove 16a that is concentric with the barrel and has a diameter substantially equal to a diameter of the barrel, and an O-ring 76 is mounted in the O-ring groove 16a. The O-ring 76 and the O-ring 75 described above enable appropriate filled gas in the resin chamber 10 and liquid having leaked from the centrifugal cylinder 2 to be prevented from leaking through an interstice between the insertion hole of the intermediate plate 14 and the chamber bearing holder 15.

The coupling chamber 16 has a barrel in a cylindrical shape that is provided with an air-port coupling 19. The air-port coupling 19 is connected to an air pipe 56 that is connected to a vacuum port valve 54 and a booster port valve 55, connected to a vacuum booster pump 53 with the air pipe 56. Air pumped into the chamber bearing holder 15 from the booster port valve 55 through the air-port coupling 19 is introduced into the centrifugal cylinder 2 through the vent hole 22 described above because the coupling chamber 16 is in an airtight state, and then the piston 6 is raised. Conversely, when the air in the chamber bearing holder 15 or in the centrifugal cylinder 2 is discharged into the vacuum port valve 54 through the air-port coupling 19, the piston 6 is lowered. This enables a component fluid after centrifugation treatment to be pushed out from a fluid to be treated in the centrifugal cylinder 2, existing above the piston 6, to the outside through the rotary joint 5, or enables a fluid to be treated to be introduced into the centrifugal cylinder 2 from the outside through the liquid phase tube 37.

Immediately below a bottom face of the chamber bearing holder 15, the drive end 43 of the magnetic coupling 8 as a noncontact torque transfer mechanism is disposed substantially concentric with the driven end 18 inside the holder 15, and the driven end 18 and the drive end 43 are disposed while facing their end faces each other. Below the drive end 43, a driven pulley 44 and a magnetic coupling shaft 45 on a drive side are sequentially fixed. The shaft 45 is vertically housed in a bearing holder 46 fitted into a bottom plate 142 fixed by the intermediate plate 14 and a stay 141, and is rotatably supported by bearings 47, 47 fixed by a bearing cap 48. Between the driven pulley 44 and a drive pulley 41 connected to a drive motor 40, a drive belt 42 is stretched to enable rotationally driving of the drive motor 40 to be transmitted to the driven pulley 44. When rotational driving force is transmitted to the driven pulley 44, the rotational driving force is transmitted to the drive end 43 of the magnetic coupling 8. This allows rotation torque to be transmitted to the driven end 18 and the centrifugal cylinder 2, without contact, so that they are rotated as described above.

As described above, the centrifugal separator 1 of the present embodiment includes the centrifugal cylinder (rotating body) 2 rotatable around the axis C, the resin chamber (outer case) 10 disposed outside the rotating body, the magnetic coupling (noncontact torque transfer mechanism) 8 composed of the driven end 18 on a centrifugal cylinder side and the drive end 43, which face each other across the coupling chamber (partition wall) 16, and the labyrinth seal (noncontact seal) 32 disposed between the centrifugal cylinder 2 and the resin chamber 10, so that the labyrinth gap 63 can be in a sealed state to form a hermetically sealed space between the centrifugal cylinder 2 and the resin chamber 10 during rotation of the centrifugal cylinder 2. As a result, even when internal fluid leaks in the rotary joint at the upper end of the centrifugal cylinder, this does not cause contamination in which broken pieces caused by abrasion of a material of a rubber seal or the like are mixed into the fluid like a conventional contact seal. In addition, even when internal fluid leaks from the centrifugal cylinder during rotation, or gas filled in the resin chamber to leak from the centrifugal cylinder, this does not cause contamination.

As illustrated in FIG. 1, the centrifugal separator 1 of the present embodiment can be provided with a flow rate sensor 39 and an RGB color sensor 38, at a midpoint in the liquid phase tube 37. This enables a control-power supply unit 51 to be configured to receive output signals of the sensors to output a control signal in accordance with variations of the received output signals. In addition, a motor driver 52 and the drive motor 40 connected to the motor driver 52 can be configured to be controlled for rotation speed, or the vacuum port valve 54 and the booster port valve 55 can be configured to be controlled for opening and closing, in accordance with the control signal. Various kinds of setting of the control-power supply unit 51 can be performed by operating a touch panel.

[Centrifugal Separation System]

Next, an embodiment of a centrifuge system of the present invention that has the centrifugal separator and is applicable to separating at least one component from a dispersion containing a plurality of components having different densities will now be described. The centrifugal separation system of the present invention mainly includes the following: the centrifugal separator described above; the pipe (e.g., the liquid phase tube 37) having one end connected to the upper end of the rotation coupling unit provided in the centrifugal separator and the other end branching into a plurality of branch pipes; and a container for a fluid to be treated and a container for at least one component fluid after being treated, the containers being connected to the corresponding branch pipes so as to communicate therewith.

At a midpoint in the pipe, there is attached at least one sensor for measuring and monitoring a flow rate or color of a liquid phase of a component fluid after being treated, fed through the pipe. For example, the flow rate sensor 39 and the RGB color sensor 38 illustrated in FIG. 1 correspond to it, and any one of or both of the flow rate sensor 39 and the RGB color sensor 38 are used in the present embodiment. Any sensor of another type and measuring method may be used as needed.

The flow rate sensor can be appropriately selected for use from among flowmeters of previously known various methods, such as a differential pressure type, an electromagnetic type, an area type, an ultrasound type, an impeller type, a thermal type, a Coriolis type, a volume type, and a vortex type, in consideration of a fluid to be treated and properties of the fluid, a flow rate range, and the like. Particularly, when a fluid to be treated is a biological fluid such as blood, it is preferable to use a flow rate sensor capable of measurement from outside a pipe through the pipe. This kind of flow rate sensor includes a thermal type flowmeter or an ultrasound type flowmeter. When this kind of flow rate sensor is used, a fluid to be treated or a component fluid after being treated is not exposed to outside air. This causes no problem of deterioration of a fluid itself and contamination.

The RGB color sensor includes a sensor body in which a transparent pipe is put to monitor the color of a fluid flowing through the pipe. And a fluid flowing through the pipe in the body is irradiated with light to acquire an RGB value for light having reached a receiving surface through the fluid. This sensor also performs measurement from outside the pipe through the pipe, so that the sensor itself is not brought into direct contact with a fluid and is not exposed to outside air. Thus, the sensor can be suitably used for separation of particularly a biological fluid such as blood.

At a midpoint of each of the plurality of branch pipes, a branch point of the plurality of branch pipe, and a branch point between the plurality of branch pipes and the pipe, there are attached selector valves capable of switching operation using electromagnetic action. This kind of selector valve is configured to perform opening and closing operation in accordance with a control signal from a control device.

The centrifugal separation system of the present invention further includes a control device (e.g., see the control-power supply unit 51 in FIG. 1) that receives an output signal from the at least one sensor, and that can output an instruction signal for switching opening and closing of each selector valve or increasing and reducing rotation speed of the centrifugal cylinder in accordance with the received output signal.

The pipe, the branch pipe, the selector valve, and the container, which are each detachably configured as an instrument of a disposable type, are available. These instruments are usually sterilized. When a biological fluid such as blood is subjected to separation treatment, for example, using such sterilized disposable instruments enables a fluid to be treated and a component fluid after being treated to be fed and contained while a flow path inside each of the instruments and the inside of the container are maintained in a sterilized state. In addition, using the instruments above in combination with the centrifugal cylinder, the movable member, and the rotation coupling unit, which are each sterilized and of a disposable type, in the centrifugal separator, enables drawing of a biological fluid to be treated, such as blood, separation of components, and feeding and containing of a component fluid after being treated while the inside of each of the instruments is maintained in a sterilized state.

The configuration described above enables the centrifugal separation system of the present invention to separate at least one or more component fluids from a fluid to be treated, containing a plurality of components, by performing the following: measuring a flow rate of a fluid to be treated with the flow rate sensor; measuring and monitoring a flow rate and/or color of a component fluid after being subjected to centrifugation treatment with the flow state sensor and the RGB color sensor; and allowing the control device to vary a position of the piston in a rotation centrifugal cylinder of the centrifugal cylinder in accordance with output signals from the sensor and to switch opening and closing of each of the selector valves or to increase and reduce rotation speed of the centrifugal cylinder, or by appropriately combining the processes above.

As described above, the centrifugal separation system of the present invention can be suitably used to separate at least one component of a plurality of components from a dispersing liquid in which a plurality of individual components of a biological material such as blood, a paint or the like is dispersed, without not only causing a problem of contamination but also without causing a fluid to be treated and a component fluid after being treated to be brought into contact with outside air. In addition, the centrifugal separator and the centrifugal separation system of the present invention can be used to separate at least one phase from a liquid composed of a plurality of phases different in density.

The present invention is not limited to the embodiments described above and can be changed without departing from the scope of the present invention. That is, the technical scope of the present invention includes an embodiment that can be acquired by combining technical means that is appropriately changed within a range shown in the scope of claims.

REFERENCE SIGNS LIST 1 centrifugal separator
2 centrifugal cylinder
2a inflow-outflow port (pipe)
3 bottom member
3a O-ring groove
5 rotary joint (rotation coupling unit)
6 piston (movable member)
10 resin chamber (outer case)
11 chamber stay
14 intermediate plate
14a O-ring groove
141 stay
142 bottom plate
15 chamber bearing holder
16 coupling chamber
17 chamber inner shaft
18 magnetic coupling driven end
19 air port coupling
20 bearing
21 bearing cap
22 vent hole
25 top plate
25a O-ring groove
25b opening (centrifugal cylinder insertion hole)
26 seal lid
26a O-ring groove
27 rotary joint housing chamber
28 seal lock
29 seal hinge pin
30 rotary joint case
30a O-ring groove
301 spacer
31 bearing
32 labyrinth seal
33 rotary shaft nut
34 rotary joint cover
34a fixed pipe
35 rotary joint shaft
36 coupling
37 liquid phase tube
38 RGB color sensor
39 flow rate sensor
40 drive motor
41 drive pulley
42 drive belt
43 magnetic coupling drive end
44 driven pulley
45 magnetic coupling shaft
46 bearing holder
47 bearing
48 bearing cap
50 graphic panel
51 control-power supply unit
52 motor driver
53 vacuum booster pump
54 vacuum port valve
55 booster port valve
56 air pipe
60 outer ring (labyrinth seal)
60a labyrinth face
61 inner ring (labyrinth seal)
61a labyrinth face
62 (rotary joint) insertion hole
63 labyrinth gap
71 to 78 O-ring
100 rotating body driving and sealing structure
101 rotating body
102 driven end
103 outer case
104 partition wall (bottom)
105 drive end
106 drive motor
107 noncontact torque transfer mechanism
108 noncontact seal
109 gap

The invention claimed is:

1. A centrifugal separator comprising:
a centrifugal cylinder supported at opposite end regions in a vertical axial direction to be rotatable around an axis of the centrifugal cylinder, the centrifugal cylinder having an upper end provided with an inflow-outflow pipe for a fluid to be treated or a component fluid after being treated;
a movable member movable up and down in the vertical axial direction inside the centrifugal cylinder in a state where an outer periphery of the movable member is in close contact with an inner peripheral surface of the centrifugal cylinder;
a rotation coupling unit provided at an upper end portion of the inflow-outflow pipe;
a outer case bottomed and disposed outside the centrifugal cylinder so as to surround the centrifugal cylinder, the outer case having an upper side provided with an opening for passing through the centrifugal cylinder and a lower side provided with a partition wall for closing the lower side to form a bottom;
a non-contact torque transfer mechanism composed of a driven end connected to a lower end of the centrifugal cylinder directly or indirectly, and a drive shaft disposed across the partition wall and facing an end face of the driven end from outside the outer case, the drive shaft being supported so as to rotate on receiving rotational driving force, the drive shaft having a drive end provided at an end close to the partition wall of the drive shaft;
a drive motor for applying the rotational driving force to the driving end;
a noncontact seal provided close to the upper end of the centrifugal cylinder, said noncontact seal including an inner ring which protrudes outwardly from an area proximate the outer peripheral wall of the centrifugal cylinder and an outer ring which protrudes inwardly from the inner peripheral wall of the outer case, said inner and outer rings configured and arranged to face each other and to form a gap therebetween in a direction orthogonal to the axis, the noncontact seal being configured to seal the gap by the centrifugal cylinder being rotated via the noncontact torque transfer mechanism, wherein an outer peripheral surface of the inner ring and an inner peripheral surface of the outer ring are each formed in a tapered shape as they extend downward from above, approaching the axis of the centrifugal cylinder;
at least one sensor provided to measure and monitor a flow rate or color of a liquid phase of a component fluid after being treated; and
a control device capable of receiving an output signal from the sensor and outputting an instruction signal for increasing and reducing a rotation speed of the centrifugal cylinder to the drive motor, on the basis of the received output signal.

2. The centrifugal separator according to claim 1, wherein the noncontact seal is configured to adjust a size of a gap formed between the centrifugal cylinder and the outer case.

3. The centrifugal separator according to claim 1, wherein the noncontact seal constitutes a labyrinth seal.

4. The centrifugal separator according to claim 3, wherein the inner ring is rotatable with respect to the outer ring, and is configured to adjust a labyrinth gap between the inner ring and the outer ring by slightly changing a height position of the inner ring vertically.

5. The centrifugal separator according to claim 1, wherein the noncontact torque transfer mechanism is a magnetic coupling.

6. The centrifugal separator according to claim 1, wherein the centrifugal cylinder, the movable member, and the rotation coupling unit are each detachably configured as an instrument of a disposable type.

7. A centrifugal separation system comprising the following (1) to (6):
(1) A centrifugal separator comprising:
a centrifugal cylinder supported at opposite end regions in a vertical axial direction to be rotatable around an axis of the centrifugal cylinder, the centrifugal cylinder having an upper end provided with an inflow-outflow pipe for a fluid to be treated or a component fluid after being treated;
a movable member movable up and down in the vertical axial direction inside the centrifugal cylinder in a state where an outer periphery of the movable member is in close contact with an inner peripheral surface of the centrifugal cylinder;
a rotation coupling unit provided at an upper end portion of the inflow-outflow pipe;
a outer case bottomed and disposed outside the centrifugal cylinder so as to surround the centrifugal cylinder, the outer case having an upper side provided with an opening for passing through the centrifugal cylinder and a lower side provided with a partition wall for closing the lower side to form a bottom;
a noncontact torque transfer mechanism composed of a driven end connected to a lower end of the centrifugal cylinder directly or indirectly, and a drive shaft disposed across the partition wall and facing an end face of the driven end from outside the outer case, the drive shaft being supported so as to rotate on receiving rotational driving force, the drive shaft having a drive end provided at an end close to the partition wall of the drive shaft; and
a noncontact seal provided close to the upper end of the centrifugal cylinder so as to form a gap between the outer case and the centrifugal cylinder in a direction orthogonal to the axis,
the noncontact seal including an inner ring, which protrudes outwardly from an area proximate the outer peripheral wall of the centrifugal cylinder, and an outer ring which protrudes inwardly from the inner peripheral wall of the outer case, said rings configured and arranged to face each other and to form a gap therebetween, wherein an outer peripheral surface of the inner ring and an inner peripheral surface of the outer ring are each formed in a tapered shape as they extend downward from above, approaching the axis of the centrifugal cylinder, the noncontact seal being configured to seal the gap by the centrifugal cylinder being rotated via the noncontact torque transfer mechanism;
(2) a pipe having one end connected to an upper end of the rotation coupling unit provided in the centrifugal separator, and the other end branching into a plurality of branch pipes;
(3) at least one sensor provided at a midpoint in the pipe to measure and monitor a flow rate or color of a liquid phase of a component fluid after being treated that is fed through the pipe;
(4) a container for a fluid to be treated and a container for at least one component fluid after being treated, the containers being connected to the corresponding branch pipes so as to communicate therewith;
(5) selector valves appropriately provided at a midpoint in each of the plurality of branch pipes, a branch point of each of the plurality of branch pipes, or a branch point between the plurality of branch pipes and the pipe, the selector valves being capable of switching operation using electromagnetic action; and
(6) a control device capable of receiving an output signal from the sensor and outputting an instruction signal for switching between opening and closing of each of the selector valves, or for increasing and reducing a rotation speed of the centrifugal cylinder, on the basis of the received output signal.

8. The centrifugal separation system according to claim 7, wherein the sensor is of a type that detects, through the pipe, a flow rate of the fluid to be treated or the component fluid, flowing through the pipe.

9. The centrifugal separation system according to claim 7, wherein the pipe, the branch pipes, the selector valves, and the containers are each detachably configured as an instrument of a disposable type.

10. The centrifugal separation system according to claim 7, wherein the noncontact seal is configured to adjust a size of a gap formed between the centrifugal cylinder and the outer case.

11. The centrifugal separation system according to claim 7, wherein the noncontact seal constitutes a labyrinth seal.

12. The centrifugal separation system according to claim 9, wherein the inner ring is rotatable with respect to the outer ring, and is configured to adjust a labyrinth gap between the inner ring and the outer ring by slightly changing a height position of the inner ring vertically.

13. The centrifugal separation system according to claim 7, wherein the noncontact torque transfer mechanism is a magnetic coupling.

14. The centrifugal separator according to claim 1, wherein the centrifugal cylinder, the movable member, and the rotation coupling unit are each detachably configured as an instrument of a disposable type.

15. The centrifugal separator of claim 1, wherein the outer peripheral surface of the inner ring and the inner peripheral surface of the outer ring are each formed in a stepped tapered shape.

16. The centrifugal separation system according to claim 7, wherein the outer peripheral surface of the inner ring and the inner peripheral surface of the outer ring are each formed in a stepped tapered shape.

\* \* \* \* \*